March 13, 1962  L. PÉRAS  3,024,886
CENTRIFUGAL CLUTCHES
Filed June 2, 1958
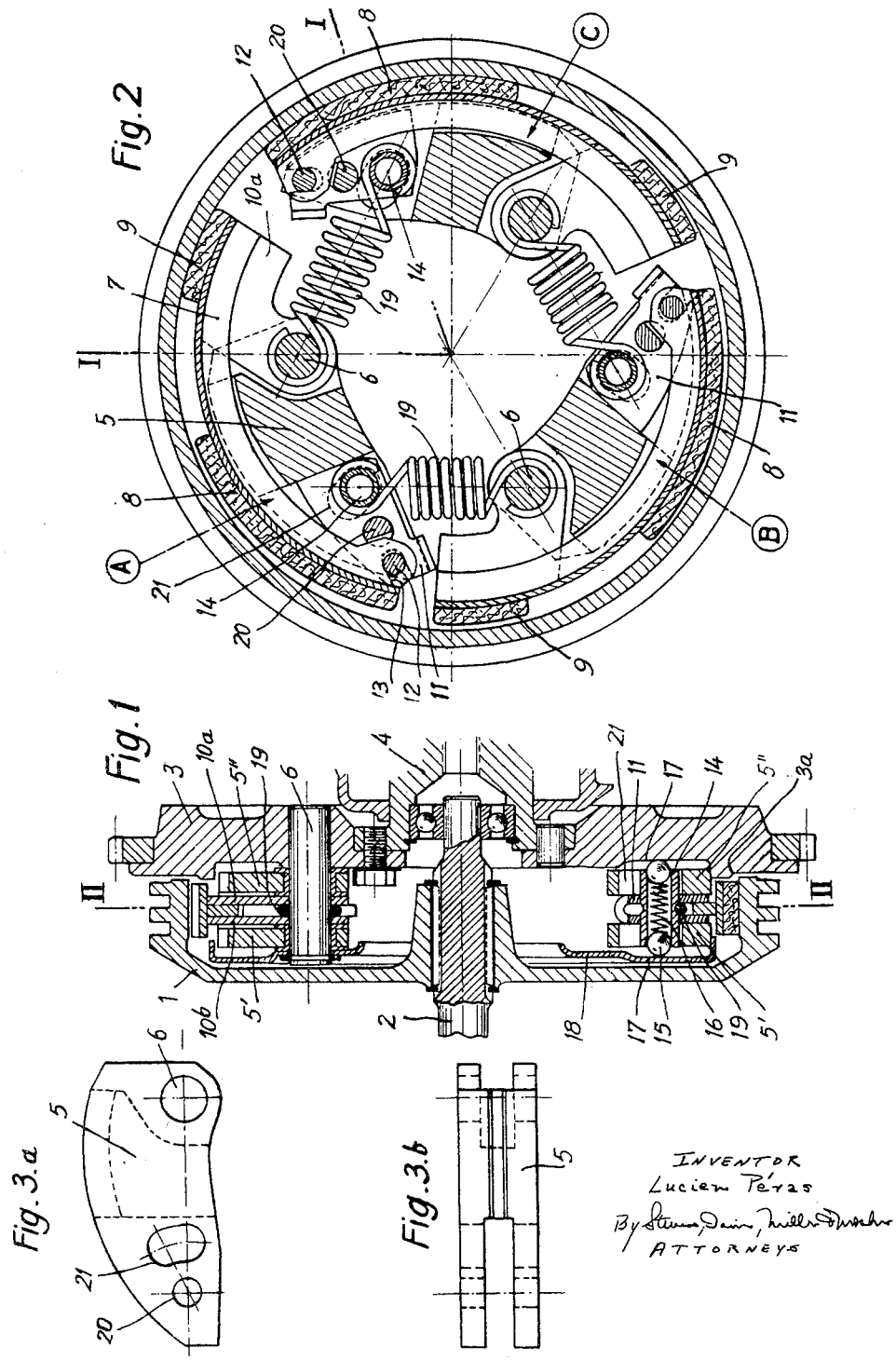
INVENTOR
Lucien Péras
By
ATTORNEYS

United States Patent Office 3,024,886
Patented Mar. 13, 1962

3,024,886
CENTRIFUGAL CLUTCHES
Lucien Péras, Billancourt, France, assignor to Regie Nationale des Usines Renault, Billancourt, France
Filed June 2, 1958, Ser. No. 739,361
Claims priority, application France June 28, 1957
2 Claims. (Cl. 192—105)

The present invention relates in general to automatic centrifugal clutches and has specific reference to a centrifugal clutch designed primarily for operation in conjunction with an automatic or semi-automatic gearbox of the epicyclic-gear or the like type, which is controlled mechanically, hydraulically or electrically, or from any other device.

In a prior well-known construction a torque convertor is associated with a centrifugal clutch in which two groups of shoes or like members, carrying friction linings, are provided, one group being operative for normally driving the wheels from the engine and the other group of shoes or like members becoming operative when the transmission members rotate faster than the engine so as to utilize for braking purposes the retarding torque of the engine or permit the starting of the engine by moving the vehicle.

This invention is concerned more particularly with improvements in or relating to this type of centrifugal clutch which is adapted to be used in combination with a torque converter. This invention has more particularly for its object to provide a clutch device wherein the two groups of friction linings are disposed on common shoes or like supports, a lining of each group being mounted on each shoe or like support, whereby the tilting of the support in one or the other direction will cause one or the other lining to contact the clutch drum. This device is also advantageous in that it makes it possible to limit the torque transmitted in case the transmission rotates faster than the engine in relation to the torque that would be transmitted in the engine direction or rotation, as well as to absorb by slipping any excess power supplied by the engine or by the vehicle during the normal driving maneuvers such as starting, steering, gear-changes, engine braking action, and finally to bring the vehicle to a standstill while a gear is engaged.

These and other features and advantages will appear more clearly as the following description proceeds with reference to the attached drawing forming part of this specification and illustrating diagrammatically by way of example a typical form of embodiment of the invention.

In the drawing:

FIGURE 1 is an axial section taken upon the line I—I of FIG. 2;

FIGURE 2 is a cross-section taken upon the line II—II of FIG. 1, and

FIGURES 3a and 3b are detail views showing one of the pivoted weights in front view and plane view, respectively.

Referring to the drawing the device illustrated therein comprises a drum 1 solid with the driven transmission shaft 2 and adjacent to the engine shaft 4. On the flywheel and inside the drum are arranged a plurality of weights 5 (three in the example illustrated) formed with flanges 5', 5" and mounted for free pivoting movement on pins 6, together with shoes 7 carrying main friction linings 8 at the rear and secondary friction linings 9 at the front, in relation to the normal direction of rotation, with respect to the pins 6. The shoes 7 are pivoted at the front through arms 10a, 10b on the aforesaid pins 6 and at the rear (according to the normal driving direction) on rockers 11 through the medium of pins 12 adapted to slide in slots 13 formed in said rockers 11. These rockers on the other hand are pivotally mounted in turn on pins 20 carried by the balance weights; in addition, these rockers 11 are formed with a heel having the function of limiting their angular movements relative to these balance weights.

A braking system is provided which consists of sockets 14 each containing a pair of balls 15 urged by an intermediate spring 16 against first cam faces 17 formed on the one hand on the flywheel 3 and second cam faces formed on closing plates 18 also carried by the pins 6. These sockets 14 are mounted in bores extending through the rockers 11 and are guided in elongated orifices 21 formed in the flanges 5', 5" of the balance weights. Relatively strong traction springs 19 are mounted between the pins 6 and sockets 14 so that in the inoperative condition the weights and shoes are urged to their rearmost positions so that the linings 9 engage the drum surface.

This apparatus operates as follows:

When the engine is stopped, the three movable assemblies constituting the clutch are in the position indicated in FIG. 2 for the assembly A. As one of the upper gears is engaged, the lining 9 provides the transmission-to-engine coupling in such a manner that the engine can be started by simply causing the vehicle to roll.

When the engine is started in the usual fashion, the starter motor causes the flywheel 3 to rotate and must overcome the slight friction of the linings 9 or the gearbox friction or drag, as long as the ignition has not produced the regular motion of the engine at its minimum or idling speed.

As long as these idling conditions are maintained the members movable about the pins 6 are balanced and position B of FIG. 2 is obtained; thus, the transmission is disengaged from the engine.

On accelerating the engine the centrifugal force acting on the weights 5 urges the linings 8 against the drum surface with a force increasing with the square of the speed of rotation.

From the moment the lining engages the drum surface the spring extension is attended by the tilting of rocker 11 about pin 12, due to the centrifugal force applied by the weight which is transmitted by the pin 20 on the rocker, the weight being urged against the corresponding shoe.

When a certain minimum speed is attained, the centrifugal movements of the weights 5 is stopped by the shoulders 3a formed on the flywheel 3 and closing plate 18. From this moment on the torque transmissible through the clutch is substantially constant.

Under high stabilized speed conditions and by construction the torque transmitted in the "pulling" or engine driving direction is of the order of four times that transmitted in the "retaining" or wheel driving the engine direction. This result is obtained by properly selecting the respective positions of the friction linings and of the pin 6.

This arrangement is such that it avoids any sudden variations in the engine speed through clutch slipping, notably when changing down to lower gears.

When the engine speed is increasing, the movement of the socket 14 brings the balls 15 in front of the cam faces to permit their movement away from each other (to the position shown in FIG. 1). The position of these cam faces is such that they are attained by the balls only for a predetermined engine speed.

When the engine speed decreases, for example during a considerable deceleration, the action of these cam faces counteracts the return action of the spring and maintains the transmission of a torque higher than that normally corresponding to the velocity of rotation considered. As a result, at low engine speeds a clutch-release movement is obtained which lags with respect to the deceleration if compared with the equal speeds obtained when accelerating. Thus, with this device any premature clutch release movements are avoided during decelerations of the vehicle when the engine approaches its idling speed.

Although, a single form of embodiment of the invention is shown in the attached drawing and described hereinabove, it will be readily understood by anybody conversant with the art that many modifications and alterations may be brought thereto without departing from the spirit and scope of the invention as set forth in the appended claims.

I claim:

1. An automatic centrifugal clutch of the type comprising a group of linings operating respectively in accordance with the rotation of the driving shaft and of the driven shaft, said clutch comprising a driving shaft having a flywheel, a driven shaft having a clutch drum operatively coupled to the flywheel, a plurality of weights pivotally carried by the flywheel, a plurality of lining supports also carried by the flywheel, a pivot pin on the flywheel for commonly mounting thereon each weight and an associated lining support, said drum operatively mounted adjacent said lining supports, a main lining on each lining support adjacent said drum for selectively engaging the drum and being arranged on its lining support behind the pivot pin with respect to the normal rotative movement of the flywheel, a secondary lining on each lining support adapted to engage the drum and being arranged on its lining support in front of the pivot pin with respect to the normal rotative movement of the flywheel, a swinging part pivotally connected between each of said weights and the rear of an associated lining support, weight limiting means consisting of stationary stops arranged on the flywheel and traction springs mounted between each of said pivot pins and said adjoining lining support so that in the inoperative position the weights and lining supports are pivoted about the pivot pins and urged to positions with the secondary linings engaging the drum.

2. An automatic centrifugal clutch according to claim 1, characterized by a socket means operatively coupled to each of said weights, each socket means having a pair of balls mounted therein, first cam faces formed on said flywheel, second cam faces operatively carried by said pivot pins, an intermediate spring between said pair of balls to urge them against said first and second cam faces, each of said traction springs operatively coupling each socket means with one of said pivot pins, so that in the inoperative position said weights and said lining supports are urged to their rearmost positions wherein said secondary lining engages the drum.

References Cited in the file of this patent

UNITED STATES PATENTS

| | | |
|---|---|---|
| 2,275,046 | Harris | Mar. 3, 1942 |
| 2,355,710 | Dodge | Aug. 15, 1944 |
| 2,392,950 | Russell | Jan. 15, 1946 |
| 2,534,133 | Kirkpatrick | Dec. 12, 1950 |

FOREIGN PATENTS

| | | |
|---|---|---|
| 310,941 | Germany | Feb. 26, 1919 |
| 507,216 | Germany | Sept. 13, 1930 |
| 1,109,553 | France | Sept. 28, 1955 |
| 1,022,890 | Germany | Jan. 16, 1958 |